United States Patent [19] [11] 4,086,853
Figov et al. [45] May 2, 1978

[54] LITHOGRAPHIC PRINTING PLATE PREPARATION

[75] Inventors: Murray Figov, Ilford; Alan Walter Kent, Frimley; Raymond Owen Stephenson, Ilford; Peter Edward Watts, Reading, all of England

[73] Assignee: Vickers Limited, London, England

[21] Appl. No.: 704,969

[22] Filed: Jul. 13, 1976

Related U.S. Application Data

[63] Continuation-in-part of Ser. No. 486,636, Jul. 8, 1976, abandoned.

[30] Foreign Application Priority Data

Jul. 11, 1973 United Kingdom ............... 33130/73

[51] Int. Cl.[2] ....................... B41C 1/10; G01D 15/08; G01D 15/20

[52] U.S. Cl. .................................... 101/463; 101/459; 101/462; 101/467; 346/135

[58] Field of Search ............... 101/457, 458, 462, 465, 101/466, 467

[56] References Cited

U.S. PATENT DOCUMENTS

| | | | |
|---|---|---|---|
| 3,263,604 | 8/1966 | Dalton | 101/467 |
| 3,309,990 | 3/1967 | Klupfel et al. | 101/462 |
| 3,315,600 | 4/1967 | Tomanek | 101/467 |
| 3,739,088 | 6/1973 | Landsman | 101/467 |

*Primary Examiner*—Clyde I. Coughenour
*Attorney, Agent, or Firm*—Reed, Smith, Shaw & McClay

[57] ABSTRACT

In addition to having two lithographic layers of complementary lithographic character, an electrically inscribable lithographic printing blank may be provided with a solid but solvent-removable protective surface layer serving to inhibit spurious abrasion of the underlying layer during inscription of the blank and prior handling and storage. To prepare a printing plate from the blank, an electric current is passed between the blank and an electrical stylus so as to inscribe through the protective layer and immediately underlying layer and expose the bottom layer locally, whereafter the protective layer is removed by treatment with solvent to expose the surface of the underlying layer.

6 Claims, 2 Drawing Figures

LITHOGRAPHIC PRINTING PLATE PREPARATION

Figure 1:
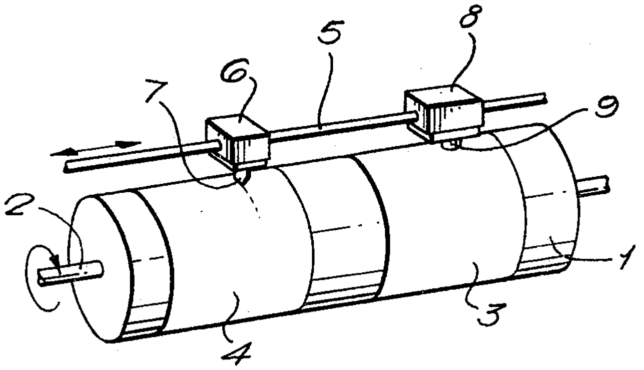

This is a continuation-in-part of application Ser. No. 486,636 filed July 8, 1974 now abandoned.

This invention relates to lithographic printing.

A printing blank having a hydrophilic surface layer under which lies a hydrophobic but ink-receptive layer can be inscribed, with an image to be printed, by means of a stylus which provides an electric discharge or flow of electric current which cuts into the hydrophilic layer so as to expose the hydrophobic inkreceptive layer at regions of the blank where this is required by the nature of the image to be printed. When, after wetting of the hydrophilic layer to make it ink-repellent, the printing plate formed by the inscription process in inked, ink is only retained by the exposed hydrophobic regions corresponding to the image to be printed, and so application of the ink image on the plate either directly or by means of an offset technique to an image-receiving surface will leave the image on that surface. The hydrophilic and hydrophobic layers of such a blank may be supported on a pliable backing of suitable strength, often made of paper. During the inscription of such a blank, the blank can be mounted on an electrically conducting support which is earthed so that stylus current passes through the blank between the stylus and the electrically conducting support. Alternatively, if a capacitive coupling arrangement is employed, the earth connection can be dispensed with.

In an electrical inscription operation on a printing blank such as described above, mechanical abrasion of the surface layer of the blank by the inscribing stylus is sometimes liable to occur. This tends to be so, for example, where a lithographic printing blank having a thin aluminum surface layer is inscribed with a tungsten stylus. In this case, the abrasion problem can be eased by employing a reduced stylus load. However, this may lead to the production of an unsatisfactory printing plate, since there are practical difficulties in maintaining the stylus in contact with the surface to be inscribed, which in practice may be running somewhat eccentrically relative to the stylus, and in accomodating stylus wear.

Another problem with such a printing blank is that the surface of the blank may get scratched or otherwise marked during prior handling or storage of the blank, which means that special precautions may have to be taken in handling and packing such blanks.

An object of the present invention is to provide a method of preparing a satisfactory lithographic printing plate in a way which, while involving electrical inscription, avoids not only the problem of mechanical abrasion during inscription but also that of marking in storage or handling prior to inscription.

German Auslegeschrift 1,456,152 discloses an electro-responsive planographic printing blank comprising a paper or plastics carrier sheet with a water-repellent but ink-receptive surface which bears a vapor-deposited metal layer (only nickel is specified). In this publication it is suggested that scratching of the metal surface during inscription can be avoided by applying a monomolecular lubricating film of mineral oil to the metal surface prior to inscription. This film is then to be removed after inscription, though the Auslegeschrift does not say how this is done. A monomolecular film of mineral oil will be extremely thin, and it is hard to believe that such a thin film would be able to prevent abrasion of the metal surface during inscription - except, perhaps, in cases where the stylus load is small, which means that the problems of maintaining stylus contact and accomodating stylus wear then arise. In any event, since the oil film is not an integral part of the blank but merely a temporarily applied auxiliary film, it does not assist during prior handling or storage of the blank. Even if it were applied during manufacture of the blank, its extreme thinness would make it inadequate for preventing scratching in handling or storage. Thus the plate preparation process described in the German Auslegeschrift does not achieve the previously mentioned object.

To achieve this object, the present invention provides a method of preparing a lithographic printing plate, said method comprising the steps of:

(i) providing an electrically-inscribable lithographic printing blank having an electrically non-conductive and hydrophobic under-layer which is receptive to lithographic oleo ink and bears an electrically-conductive hydrophilic over-layer which is renderable repellent to such ink by wetting and is coated with a solid and electrically partially-conductive protective layer serving to inhibit mechanical abrasion of said over-layer during inscription of the blank with an electrical stylus and during prior handling and storage of the blank, the layers of said blank having compositions and thicknesses selected to permit local removal of said protective layer and said over-layer, by inscription of the blank with such a stylus, so as to expose said under-layer locally, and said protective layer being totally removable by treatment with a solvent which leaves said over-layer and said under-layer intact;

(ii) passing stylus current between blank and stylus while producing relative movement therebetween thereby to inscribe through said protective layer and said over-layer and expose said under-layer locally, said protective layer preventing mechanical abrasion of said over-layer by said stylus during the inscription; and (iii) treating the inscribed blank with said solvent to remove the remainder of said protective layer from said over-layer.

Particularly suitable for use in the present invention is the lithographic printing blank forming the subject of the applicants' co-pending U.S. Pat. application Ser. No . . . , which is also a continuation-in-part of application Ser. No. 486,636. This blank comprises:

(i) an electrically non-conductive layer-form support which is from 50 to 200 microns thick and has a hydrophobic surface which is receptive to lithographic oleo ink, the support being made of a material selected from the group consisting of paper, polyester film, and polyester film laminated to paper;

(ii) an electrically conductive hydrophilic over-layer which is from 0.025 to 0.1 micron thick and is renderable repellent to lithographic oleo ink by wetting, said over-layer being a layer of metal vapor-deposited onto said hydrophobic surface and having a surface resistance of from 0.3 to 2 ohms per square, said metal being selected from the group consisting of aluminum, chromium and nickel; and (iii) a solid and electrically partially-conductive protective layer coating said over-layer to a weight of from 1 to 15 grams per square meter, said protective layer having a d.c. breakdown voltage of from 10 to 400 volts and being composed of a mixture which comprises from 50% to 90% by weight of finely divided material selected from the group consisting of zinc oxide, zinc sulphide, carbon and mixtures thereof, and from 10% to 50% by weight of a film-forming resin material which is readily soluble in a solvent selected from the group consisting of water, alcohol and water/alcohol mixtures.

The vapor-deposited metal over-layer of the blank is preferably formed by vapor-deposition of aluminum to a thickness of about 0.05 micron onto a polyester support. Being electrically conductive, the over-layer itself acts as an electrode for stylus current during the inscription of the blank.

After removal of the protective layer of the blank, the over-layer may be etched so as to give its surface a sufficiently water-receptive quality. Alternatively, the protective layer may be removed with a specially formulated treatment solution, so that removal of this layer and preparation of the plate for printing can be performed in a single operation. The material of the protective layer should then be a material which is easily removable by a treatment solution (including a suitable solvent, e.g. water, alcohol, water/alcohol mixtures, and monoethylene glycol) that at the same time prepares the plate for printing. To this end, the protective layer may comprise finely divided electrically active material, (e.g. zinc oxide, zinc sulphide or carbon) in a film-forming resin material which comprises a resin or combination of resins such as polyvinyl acetate, polyvinyl alcohol, nylon, polyvinyl acetate/ethyl acrylate co-polymer, urea formaldehyde, melamine formaldehyde, and polyacrylate. The resin material used may optionally include at least one of the resins carboxy methyl cellulose, hydroxy ethyl cellulose, and hydroxy propyl cellulose. The material of the protective layer may optionally include a plasticizer, for example castor oil, camphor, dibutyl phthalate, diethylene glycol, glycerin, or dioctyl phthalate.

Figure 2:
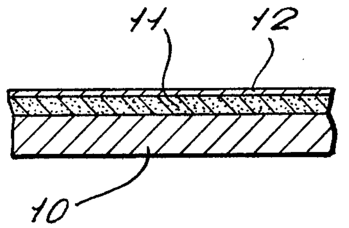

Reference will now be made, by way of example, to the accompanying drawings, in which:

FIG. 1 is a schematic perspective view of an apparatus for use in carrying out a method embodying the invention, and FIG. 2 is a schematic sectional view of an electro-responsive lithographic printing blank used in the method.

FIG. 1 shows a cylindrical drum 1 mounted concentrically on a rotatable shaft 2. An original document 3 to be reproduced and a flexible electro-responsive lithographic printing blank 4 are stretched side-by-side around the cylindrical surface of the drum 1. On an axially-displaceable shaft 5 extending parallel to the rotatable shaft 2 is mounted a stylus-carrying arm 6 which supports an electronically-operable stylus 7 adjacent to the blank 4. Also mounted on the shaft 5 is an optical scanning device 8 having a photohead 9 thereof supported adjacent to the document 3. When the shaft 2 is rotated, the blank 4 and the document 3 rotate with the drum 1. Simultaneously, the shaft 5 is made to traverse the drum 1 axially so that as the photohead 9 scans the surface of the document 3, the stylus 7 synchronously scans the surface of the blank 4.

As shown in FIG. 2, the blank 4 comprises an under-layer 10 of hydrophobic but ink-receptive (oleophilic) electrically non-conducting material bearing an over-layer 11 of hydrophilic and, when wetted, ink-repellent (oleophobic) electrically-conducting material. Here the terms ink-repellent and ink-receptive are to be understood in relation to lithographic oleo inks. The over-layer 11 may for example be a vapor-deposited film or thin foil of aluminum. Typically, the over-layer 11 may be an aluminised layer of 0.05 micron thick borne on one side of a plastics sheet of 50 to 150 microns thick, for example a sheet of polyester material 50 to 100 microns thick, constituting the under-layer 10.

The over-layer 11 of the blank 4 is coated with a protective layer 12 which may for instance be produced from a formulation such as described in either of the two examples given below. Preferably, the blank 4 is a blank according to the applicants' co-pending continuation-in-part application referred to previously, and the two formulation examples given below in fact lead to a protective layer which meets the requirements specified for such a blank.

The blank 4 is arranged on the drum 1 so that the protective layer 12 is outermost.

The scanning device 8 serves to provide an output signal which varies in accordance with the instantaneous intensity of the light received by the photohead 9 from the document 3 as the photohead scans over the document. This signal is amplified and supplied to the stylus 7 to effect inscription of the blank 4. At regions where the stylus 7 passes over the blank 4, material in the coated over-layer 11 is removed and so the surface of the non-conducting material of the under-layer is exposed adjacent to those regions. In this way the image on the document 3 can be reproduced in the surface of the blank 4.

The protective layer 12 is provided so as to protect the electrically-conducting over-layer 11 from being mechanically abraded by the stylus 7 as the stylus scans over the blank in imitation of the scanning motion executed by the photohead 9 over the original document 3. It also serves to prevent abrasion during handling or storage of the blank, and to influence the response of the blank to electrical inscription so that tonal imaging is possible.

As a first example, the protective layer 12 may be prepared from a formulation having the following composition:

24 grams Acetylene Black
40 grams Polyvinyl Acetate
10 grams Diethylene Glycol
500 grams Ethanol
100 grams Water The protective layer 12 is formed by applying the formulation to the surface of the over-layer 11 and allowing the solvent to evaporate. The formulation is applied in a quantity sufficient for the protective layer 12 deposited to have a weight of 5 grams per square meter of the surface of the over-layer 11. Following inscription of the blank in the manner described, the protective layer is removed by washing off with a 50/50 water/alcohol mixture prior to use of the inscribed blank for printing. After removal of the protective layer 12, the now exposed surface of the over-layer 11 should be etched, however, so as to enhance its water-receptive properties. This etching may be performed with a treatment solution having the following composition:

300 ml Water
9 ml Phosphoric Acid
9 grams Gum Arabic or, alternatively, with a treatment solution having the following composition:

10 parts Diethylene Glycol
10 parts Ethyl Lactate
2 parts 88% Phosphoric Acid
38 parts Ethanol
40 parts water.

After etching of the surface of the exposed over-layer of the blank 4 as required, the blank can be transferred to a suitable lithographic printing machine for reproducing onto an ink-receiving surface the image inscribed in the blank. In such a machine, for instance, the inscribed blank may be stretched around a rotatable drum arranged so that during each revolution of the drum ink is applied to the face of the blank following wetting thereof to make the over-layer ink-repellent. The ink is only retained, however, by the hydrophobic ink-receptive exposed surfaces of the non-conducting under-layer 10 adjacent to regions where the over-layer 11 has been removed. As the drum rotates the ink image borne on the exposed ink-receptive surfaces is rolled onto an adjacent parallel roller in contact therewith which receives the ink image and transfers this to a paper web which is arranged to roll over the surface of the intermediate roller.

As a second example, the protective layer 12 may be prepared from a formulation having the following composition (in parts by weight):

8 parts Hydroxy propyl cellulose (KLUCEL G supplied by Hercules Powder Do. Ltd.)
8 parts soluble nylon (ULTRAMID IC supplied by B.A.S.F. Ltd.)
80 parts Zinc oxide
60 parts Water
520 parts Ethanol.

Again, the protective layer 12 is formed by applying the formulation to the surface of the over-layer 11 and evaporating excess solvent (in this case water and ethanol). The formulation may, for example, be applied in a quantity sufficient for the protective layer deposited on the over-layer 11 to have a weight of 8 grams per square meter. The protective layer can be removed with water following inscription of the blank. However, the layer may alternatively be removed with the latter of the previously specified treatment solutions, with the result that preparation of the plate for printing takes place in the same step as layer removal.

It will be noted that, in the case of the protective layer produced with the formulation given in each example, the weight of film-forming resin material (i.e. vinyl acetate, or nylon and hydroxy propyl cellulose) in the dry film lies between 10 and 50% of the total weight of the protective layer while the weight of zinc oxide or carbon lies between 50 and 90% of the total layer weight. The electrically active zinc oxide or carbon serves to make the protective layer electrically partially conductive, to the extent that the d.c. voltage which must be applied between the stylus 7 and the metal over-layer 11 to make current flow through the protective layer (i.e. the d.c. breakdown voltage) lies between 10 and 400 volts.

What is claimed is:

1. A method of preparing a lithographic printing plate which method comprises the steps of:

(i) providing an electrically-inscribable lithographic printing blank by (a) vapor-depositing onto an under-layer which is electrically non-conductive, hydrophobic and receptive to lithographic oleo ink, a thin over-layer of metal selected from the group consisting of aluminum, chromium and nickel, said over-layer being electrically-conductive, hydrophilic and renderable repellent to said lithographic oleo ink by wetting and (b) coating said over-layer of metal from solution with a solid and electrically partially conductive protective layer formed from a mixture of a finely divided electrically partially-conductive solid material and a film-forming resin material, said protective layer having a weight of from 1 to 15 grams per square meter and a d.c. breakdown voltage of from 10 to 400 volts and which is totally removable by treatment with a solvent which leaves said under-layer and said over-layer intact, said protective layer serving to inhibit mechanical abrasion of said over-layer during inscription of the blank with an electrical stylus and during prior handling and storage of the blank, the layers of said blank having thicknesses selected to permit local removal of said protective layer and said over-layer, by inscription of said blank under such an electrical stylus, so as to expose said under-layer locally;

(ii) passing stylus current between said blank and a stylus while producing relative movement therebetween thereby locally removing said protective layer and said over-layer and exposing said under-layer, said protective layer preventing mechanical abrasion of said over-layer by said stylus during the inscription; and (iii) treating the inscribed blank with said solvent to remove the remainder of said protective layer from said over-layer whilst leaving the over-layer and said under-layer intact.

2. The method of claim 1, wherein said film-forming resin material comprises at least one member of the group consisting of poly (vinyl acetate), poly(vinyl alcohol) nylon, poly (vinyl acetate/ethyl acrylate) copolymer, urea-formaldehyde resin, melamineformaldehyde resin and polyacrylate and wherein said solvent comprises at least one member of the group consisting of an alcohol water, and mixtures of water and an alcohol.

3. A method of preparing a lithographic printing plate, said method comprising the steps of:

(i) providing an electrically-inscribably lithographic printing blank by (a) vapor-depositing onto an under-layer which is from 50 to 200 microns thick, which is made of a material selected from the group consisting of paper, polyester film, and polyester film laminated to paper, and which is electrically non-conductive, hydrophobic and receptive to lithographic oleo ink, an over-layer of metal which is from 0.025 to 0.1 micron thick, and has a surface resistance of from 0.3 to 2 ohms per square, said metal being selected from the group consisting of aluminum, chromium, and nickel; and said over-layer being electrically-conductive, hydrophilic and renderable repellent to said lithographic oleo ink by wetting and (b) coating said over-layer of metal from solution with a solid and electrically partially-conductive protective layer having a weight of from 1 to 15 grams per square meter, and a d.c. breakdown voltage of from 10 to 400 volts and being composed of a mixture which comprises from 50 to 90%, by weight of the dry protective layer, of finely divided material selected from the group consisting of zinc oxide, zinc sulphide, carbon and mixtures thereof, and from 10 to 50%, by weight of the dry protective layer, of a film-forming resin material which is readily soluble in a solvent selected from the group consisting of water, an alcohol, and mixtures of water and an alcohol, said protective layer serving to inhibit mechanical abrasion of said over-layer during inscription of the blank with an electrical stylus and during prior handling and storage of the blank, the layers of said blank permitting local removal of said protective layer and said over-layer, by inscription of said blank under such a stylus, so as to expose said under-layer locally, and said protective layer being totally removable by treatment with the solvent to leave said over-layer and said under-layer intact;

(ii) passing stylus current between said blank and a stylus while producing relative movement therebetween thereby locally removing said protective layer and said over-layer and exposing said under-layer, said protective layer preventing mechanical abrasion of said over-layer by said stylus during the inscription; and (iii) treating the inscribed blank with said solvent to remove the remainder of said protective layer from said over-layer.

4. The method of claim 3, wherein said film-forming resin material comprises at least one member of the group consisting of poly(vinyl acetate), poly(vinyl alcohol), nylon, poly(vinyl acetate/ethyl acrylate) copolymers, urea-formaldehyde resin, melamine-formaldehyde resin, and polyacrylate.

5. The method of claim 3, including the step of etching the surface of said over-layer after removal of said protective layer.

6. The method of claim 3, wherein said protective layer is removed with a treatment solution which contains a solvent for removing said protective layer and also serves to etch the thereby exposed surface of said over-layer.

* * * * *